Patented Feb. 5, 1946

2,394,430

UNITED STATES PATENT OFFICE 2,394,430

PROCESS FOR THE PRODUCTION OF UNSATURATED OXIMES

John Alexander Crowder, Mearl Alton Kise, and Glenn Albert Nesty, Syracuse, N. Y., assignors to The Solvay Process Company, New York, N. Y., a corporation of New York No Drawing. Application February 19, 1943, Serial No. 476,468

9 Claims. (Cl. 260—566)

This invention relates to a process for the preparation of unsaturated oximes. More particularly the invention relates to the preparation of alpha-beta-unsaturated oximes from addition products of olefines with a nitrosyl halide of the class consisting of nitrosyl chloride and nitrosyl bromide.

Heretofore, oximes have been prepared in general by reaction of aldehydes or ketones with hydroxylamine or its salts. This procedure has been employed for preparing unsaturated oximes as well as saturated oximes. Thus it is known to prepare the following unsaturated oximes by this procedure: crotonaldoxime (Monatshefte 12, 1891, page 410) and alpha-methyl beta-ethyl acroleinoxime (Journal of the Russian Physical-Chemical Society 19, 1887, page 309). This procedure has the disadvantage, however, that hydroxylamine and its salts are relatively expensive as commercial reagents. It has also been proposed to prepare methyl isopropenyl ketoxime by reaction of amylene nitrosate with sodium in the presence of alcohol (Annalen 262, 1891, page 339). Reactions of the latter type are complicated, are generally inconvenient, and result in poor yields of oxime.

We have now discovered that certain addition products of olefines with nitrosyl halides of the class consisting of nitrosyl chloride and nitrosyl bromide can be readily converted to unsaturated oximes by the removal from them of the elements of hydrogen halide. The olefine-nitrosyl halide addition products capable of being converted to unsaturated oximes by said treatment are those containing at least 4 carbon atoms of which the carbon atom to which the nitroso group is attached and another carbon atom adjacent to that bearing the halogen atom each bears at least one hydrogen atom.

In general the olefine-nitrosyl halide addition products are believed to include the following configuration:

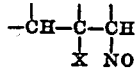

wherein X is a chlorine or a bromine atom. The addition products derived from the lower olefines form colorless dimeric compounds by combination of two molecules of the monomeric addition products. The monomeric as well as the dimeric addition products are suitable for treatment according to the process of the invention. The addition products can be readily obtained by reacting nitrosyl chloride or bromide with olefines containing at least 4 carbon atoms, more particularly 4 to 20 carbon atoms, and including a radical having the configuration:

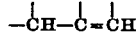

Lower molecular weight olefine-nitrosyl halide addition products in which the parent olefines contain from 4 to 6 carbon atoms are preferably derived from iso-olefines having the configuration:

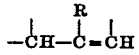

wherein R represents a low molecular weight alkyl group, by reaction with nitrosyl chloride or bromide. The resulting addition products apparently contain a radical having the configuration:

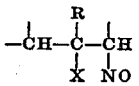

wherein X represents a halogen atom of the class consisting of chlorine and bromine, and R represents the alkyl group of the parent olefine.

Nitrosyl chloride is available in large amounts at relatively low cost, while olefines are commercially available as products obtained, for instance, by cracking of petroleum. Thus the process of this invention affords an economical procedure for commercial production, from commercially available starting materials, of a class of unsaturated oximes which were heretofore little more than laboratory curiosities. The addition products of nitrosyl chloride are preferred to those of nitrosyl bromide because of the relatively lower cost of the former.

The process of the invention may be advantageously applied, for example, for the preparation of methacrolein oxime from the colorless crystalline addition product of nitrosyl chloride and isobutene which is apparently a dimeric bis-nitroso compound (M. P., 104° C.) having the probable formula:

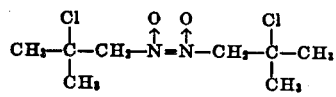

The process may also be applied to the monomeric nitrosyl halide addition products of higher olefines, for instance, the green nitroso chlorides of octene-1 and octene-2. Such addition products can be produced, for example, by passing 65.5 parts by weight of NOCl over a period of 3 hours into 112 parts by weight of an octene mixture (containing about 75 parts of octene-1 and about 37 parts of octene-2 and obtained by dehydration of octanol-1 with $H_3PO_4$) together with 100 parts by weight of $CCl_4$ as a solvent, maintained at 25° C. and then evaporating excess nitrosyl chloride and $CCl_4$ in vacuo. The greenish colored liquid reaction product, thus obtained, contains the monomeric nitroso-chlorides of the aforesaid octenes.

The procedure according to this invention for dehydrohalogenation of the aforesaid olefine-nitrosyl halide addition products comprises reaction thereof under substantially anhydrous conditions with a mildly alkaline dehydrohalogenating agent which is capable of neutralizing strong mineral acids. Thus, an olefine-nitrosyl halide addition product of the aforesaid type can be heated under substantially anhydrous conditions with a salt of an organic acid, especially of acetic acid, at temperatures of about 50° to about 100° C., preferably in the presence of an inert organic liquid reaction medium (solvent or suspension medium). The organic acid (e. g., acetic acid) is thereby liberated, and the halide of the cation of said salt is formed. This halide, and generally any excess organic salt, precipitates from the solution and can be separated therefrom by filtration. The free acid contained in the reaction mixture can be neutralized, for instance, with a reagent yielding the salt of the organic acid originally used, and this salt likewise can be separated from the mixture. A solution of the unsaturated oxime in the solvent medium is thereby obtained, from which the oxime can be recovered, for instance, by fractional distillation.

The quantity of organic acid salt employed is preferably in excess of the amount theoretically required for complete reaction with the hydrogen halide to be removed. When a salt is used which is substantially insoluble in the reaction medium and solid at the reaction temperature, an excess of about 100% of the amount theoretically required, or more, is preferably used, and the salt is finely powdered in order to increase its surface and thereby facilitate the reaction. Organic acid salts which form a separate liquid phase at the reaction temperature employed may be emulsified in the reaction medium, in which case optimum results may be obtained with an excess of the salt which is somewhat less than 100% over the theoretically required amount.

In general, any salt capable of acting as a buffer to limit acidity may be employed, but salts of organic acids, such as acetic acid, are preferred in view of their slight but appreciable solubility in the reaction media normally used. The use of organic acid salts which are fusible at reaction temperature is especially preferred in view of the relatively rapid reaction obtained thereby. We have found that sodium acetate and ammonium acetate are particularly suitable as dehydrohalogenating agents, and especially ammonium acetate.

Sodium acetate, which is solid at the reaction temperature, is preferably used in finely divided form. The resulting sodium halide and the excess sodium acetate can be separated from the reaction mixture by filtration. The acetic acid remaining in the reaction mixture may be advantageously neutralized with powdered anhydrous sodium carbonate or sodium bicarbonate, and the sodium acetate thereby formed may be filtered out and recycled for subsequent dehydrohalogenations.

In the case of ammonium acetate, the technical salt can generally be employed in a molten state and emulsified in the solvent medium, by maintaining the reaction mixture at about 90° to about 100° C. (While pure ammonium acetate melts at about 114° C., the technical reagent usually melts at about 89° C.) The fact that the reagent is present in the liquid phase results in a more rapid reaction than is obtained by use of a finely powdered solid salt, such as sodium acetate, as a reagent. After the reaction is complete, the mixture is cooled, and the ammonium halide which is formed as a result of the reaction, together with excess ammonium acetate, can be removed by filtration. The acetic acid remaining in the solution can be advantageously neutralized by passing in gaseous ammonia, thereby regenerating ammonium acetate which can be separated in any desired manner; for example, the temperature may be raised once more above the fusion point of this salt, and the molten ammonium acetate removed from the remaining reaction mixture by decantation. Salts of organic acids other than acetic acid can also be used, such as, for instance the salts of butyric, stearic, or alkenyl-succinic acids.

Suitable solvents and diluents for use in the above procedure are organic liquids which are inert with respect to the reagents and which contain no substantial amounts of water or other reactive hydroxylic compounds; for example, petroleum naphtha, ethyl acetate, or dioxane.

The invention will be more readily understood from the following examples in which parts are by weight and temperatures are in degrees centigrade.

*Example 1*

510 parts of the crystalline dimeric addition product of isobutene and nitrosyl chloride (obtained, for instance, by passing nitrosyl chloride into a cracked petroleum fraction consisting mainly of hydrocarbons having 4 carbon atoms, and composed of isobutene (isobutylene), n-butenes and butanes in the proportion of about 2 parts of n-butenes and 1 part of butanes per part of isobutene, under superatmospheric pressure at about 25°, and separating the colorless crystalline addition product formed thereby from the remaining mixture of unreacted butenes and butanes) are added portion-wise to an emulsion of 355 parts of molten ammonium acetate in 1525 parts of petroleum naphtha (e. g., varnish makers' and painters' naphtha having a boiling range from about 88° to about 154°) maintained at a temperature of about 95°. Upon completion of the ensuing reaction, the mixture is cooled until the residual ammonium acetate solidifies, and the ammonium chloride and ammonium acetate are removed by filtration. The filter cake, comprising about 225 parts ammonium chloride and about 32 parts ammonium acetate, is washed with petroleum naphtha and the washings added to the filtrate. The latter contains the acetic acid liberated by reaction of the ammonium acetate with the addition product. The acid filtrate is neutralized by passing in gaseous ammonia. The temperature is then advantageously raised to about 120°, and molten ammonium acetate separated from the organic solution by decantation. This salt can be recycled for use in the next dehydrohalogenation batch. If desired, about 25 parts of glacial acetic acid can be added to the filtrate prior to the ammoniation to replace the acetic acid removed as ammonium acetate in the filter cake.

The resulting solution contains about 250 parts of methacrolein oxime (methacrylaldoxime) together with about 106 parts of organic by-products. Methacrolein oxime can be recovered, if desired, by fractional distillation of the solution in vacuo as a fraction boiling at 45° to 48° at an absolute pressure of 6 mm. of mercury, or at about 150° at atmospheric pressure.

It is a limpid liquid whose empirical formula, determined by analysis, is $C_4H_7NO$; its density: $d_4^{19.3}$ is 0.97375; its index of refraction: $n_D^{19.3}$ is 1.4430; its molecule refraction: $M_D = 23.16$. Upon hydrogenation in the presence of catalytic nickel, 3 mols of hydrogen are absorbed for each mol of the oxime, and isobutylamine is formed, as shown by the melting point of its hydrochloride (i. e. 169 to 170°). It is particularly useful as an anti-skinning agent in paint, varnish, and other drying-oil compositions. If the organic solvent employed in the direct dehydrohalogenation procedure hereinbefore exemplified is compatible with such compositions, the solution of the oxime in the reaction medium can be added to a coating composition of the aforesaid type without preliminary isolation of the oxime. For instance, the solution of methacrolein oxime in petroleum naphtha obtained from the reaction mixture of Example 1 can be used, without isolating the oxime therefrom, as an anti-skinning adjuvant for such compositions.

*Example 2*

120 parts of isobutene bis-nitroso chloride (obtained for instance by reacting nitrosyl chloride with an excess of pure isobutene under the temperature and pressure conditions mentioned in the preceding example, and separating the crystalline addition product which is formed from the excess isobutene which serves as a reaction medium) are added to a suspension of 172 parts of finely powdered sodium acetate in 620 parts of ethyl acetate maintained at a temperature of 78°. The reaction mixture is agitated and the temperature maintained at about 78° for about 1½ hours. The mixture is then cooled and the sodium chloride formed by the reaction, together with unreacted sodium acetate, is filtered out. The filter cake is washed with ethyl acetate and the combined filtrate and washings are neutralized by agitation with 85 parts of sodium bicarbonate. From the resulting slurry, sodium acetate and any excess of bicarbonate is removed by filtration. The filtrate contains about 64 parts of methacrolein oxime in ethyl acetate solution. The said oxime is accompanied by a polymer thereof, and can be readily recovered by fractional distillation of the solution.

Olefine-nitrosyl halide addition products contained in the reaction mixture resulting from reaction of the parent olefine with a nitrosyl halide can be dehydrohalogenated according to this invention without preliminary isolation from the nitrosation mixture. However, in the case of olefine-nitrosyl halide addition products which can be readily crystallized from the nitrosation reaction mixture, especially dimers of the type of isobutene bis-nitroso-chloride, it is preferable to isolate the addition product prior to dehydrohalogenation thereof, in order to reduce contamination of the unsaturated oximes with impurities.

Variations and modifications in the foregoing procedures may be made within the scope of the invention and will be apparent to those skilled in the art. The details of the foregoing description are therefore to be interpreted as illustrative and not in a limiting sense.

We claim:

1. A process for the production of an unsaturated oxime, which comprises reacting the addition product of an olefine containing at least 4 carbon atoms and including a radical having the configuration

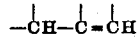

and a nitrosyl halide of the class consisting of nitrosyl chloride and nitrosyl bromide, with a salt of an organic acid at a temperature of about 50° to about 100° C. under substantially anhydrous conditions, in an inert non-hydroxylic liquid organic reaction medium.

2. A process for the production of an unsaturated oxime, which comprises reacting the nitrosyl chloride addition product of an olefine containing 4 to 20 carbon atoms and including a radical having the configuration

with a salt of acetic acid at a temperature of about 50° to about 100° C. under substantially anhydrous conditions, in an inert non-hydroxylic liquid organic reaction medium.

3. In a process for the production of an unsaturated oxime, the steps which comprise reacting the addition product of an olefine containing 4 to 20 carbon atoms and including a radical having the configuration

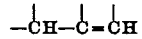

and a nitrosyl halide of the class consisting of nitrosyl chloride and nitrosyl bromide, in an inert non-hydroxylic organic solvent under substantially anhydrous conditions, with a salt of an organic acid, said salt being substantially insoluble in the reaction mixture, at a temperature of about 50° to about 100° C.; neutralizing the organic acid liberated thereby; and separating the resulting halide and organic acid salt from the reaction mixture.

4. A process for the production of an unsaturated oxime, which comprises reacting the addition product of an olefine containing 4 to 20 carbon atoms and including a radical having the configuration

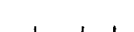

and a nitrosyl halide of the class consisting of nitrosyl chloride and nitrosyl bromide with a mildly alkaline salt of an organic acid in the liquid phase under substantially anhydrous conditions in an inert non-hydroxylic organic liquid reaction medium, at a temperature of about 50° to about 100° C.

5. A process for the production of an unsaturated oxime which comprises reacting the addition product of an olefine containing 4 to 20 carbon atoms and including a radical having the configuration

and a nitrosyl halide of the class consisting of nitrosyl chloride and nitrosyl bromide with fused ammonium acetate under substantially anhydrous conditions in an inert non-hydroxylic organic liquid reaction medium at a temperature of about 90° to about 100° C.

6. A process for the production of methacrolein oxime, which comprises reacting the colorless crystalline addition product of iso-butene and nitrosyl chloride with a molecular excess of ammonium acetate under substantially anhydrous conditions in an inert non-hydroxylic liquid organic reaction medium at a temperature of about 95° C.; adding ammonia to the resulting mixture to neutralize the acetic acid produced as a byproduct; heating the resulting mixture to a temperature above the fusion temperature of ammonium acetate; and separating the molten ammonium acetate from the remaining solution.

7. A process for the production of an unsaturated oxime which comprises reacting the addition product of an olefine containing 4 to 20 carbon atoms and including a radical having the configuration

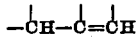

and a nitrosyl halide of the class consisting of nitrosyl chloride and nitrosyl bromide, in an inert non-hydroxylic organic solvent under substantially anhydrous conditions, at a temperature of about 50° to 100° C., with a salt of an organic acid which forms a separate liquid phase at the temperature of the reaction.

8. A process for the production of an unsaturated oxime which comprises reacting the dimeric addition product of an iso-olefine containing 4 to 6 carbon atoms and a nitrosyl halide of the class consisting of nitrosyl chloride and nitrosyl bromide with a salt selected from the group consisting of sodium acetate and ammonium acetate under substantially anhydrous conditions, in an inert non-hydroxylic liquid organic reaction medium at a temperature of about 50° to 100° C.

9. A process for the production of an unsaturated oxime, which comprises reacting the addition product of an iso-olefine containing 4 to 6 carbon atoms and including a radical having the configuration

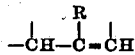

wherein R represents a lower alkyl group, and a nitrosyl halide of the class consisting of nitrosyl chloride and nitrosyl bromide, with a salt of an organic acid under substantially anhydrous conditions in an inert non-hydroxylic liquid organic reaction medium at a temperature of about 50° to about 100° C.

JOHN A. CROWDER.
MEARL ALTON KISE.
GLENN ALBERT NESTY.